United States Patent
Clement et al.

(10) Patent No.: US 7,272,634 B2
(45) Date of Patent: Sep. 18, 2007

(54) SYSTEM AND METHOD FOR INTEGRATING MULTIPLE MESSAGING SYSTEMS

(75) Inventors: Jason Lee Clement, San Diego, CA (US); Kyoko Takeda Wieck, San Diego, CA (US); Theodore R. Booth, III, San Diego, CA (US); Brian James Moon, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 454 days.

(21) Appl. No.: 10/964,939

(22) Filed: Oct. 14, 2004

(65) Prior Publication Data

US 2005/0210112 A1    Sep. 22, 2005

Related U.S. Application Data

(60) Provisional application No. 60/554,755, filed on Mar. 18, 2004.

(51) Int. Cl.
G06F 15/16 (2006.01)
(52) U.S. Cl. ...................... 709/206; 709/246
(58) Field of Classification Search ........ 709/201–230, 709/246
See application file for complete search history.

(56) References Cited

U.S. PATENT DOCUMENTS

| | | | |
|---|---|---|---|
| 6,697,840 B1 | 2/2004 | Godefroid et al. | 709/205 |
| 7,171,190 B2* | 1/2007 | Ye et al. | 455/412.1 |
| 2002/0035605 A1 | 3/2002 | McDowell et al. | 709/206 |
| 2002/0065894 A1 | 5/2002 | Dalal et al. | 709/206 |
| 2002/0078150 A1 | 6/2002 | Thompson et al. | 709/204 |
| 2002/0126701 A1 | 9/2002 | Requena | 370/469 |
| 2003/0009511 A1* | 1/2003 | Giotta et al. | 709/201 |
| 2003/0023691 A1* | 1/2003 | Knauerhase | 709/206 |
| 2003/0028597 A1 | 2/2003 | Salmi et al. | 709/204 |
| 2003/0041141 A1 | 2/2003 | Abdelaziz et al. | 709/223 |
| 2003/0046396 A1* | 3/2003 | Richter et al. | 709/226 |
| 2003/0065788 A1 | 4/2003 | Salomaki | 709/227 |
| 2003/0131142 A1 | 7/2003 | Horvitz et al. | 709/313 |
| 2003/0154293 A1 | 8/2003 | Zmolek | 709/228 |
| 2003/0158902 A1* | 8/2003 | Volach | 709/206 |
| 2004/0003042 A1 | 1/2004 | Horvitz et al. | 709/204 |
| 2004/0028208 A1 | 2/2004 | Carnazza et al. | 379/221.01 |
| 2004/0054735 A1* | 3/2004 | Daniell et al. | 709/206 |
| 2004/0059781 A1 | 3/2004 | Yoakum et al. | 709/204 |
| 2004/0064511 A1 | 4/2004 | Abdel-Aziz et al. | 709/206 |
| 2004/0071150 A1 | 4/2004 | Honkala et al. | 370/401 |

(Continued)

OTHER PUBLICATIONS

Miao et al., Seamless messaging in a multimedia network environment, Signal processing, 2002 6th International Conference onvol. 2, Aug. 26-30, 2002, pp. 1031-1034.*

(Continued)

*Primary Examiner*—Andrew Caldwell
*Assistant Examiner*—Douglas Blair
(74) *Attorney, Agent, or Firm*—John L. Rogitz

(57) ABSTRACT

A system and method for allowing a sender to use a generic message entry form for all messaging systems, including email, instant messaging, and the like. The user enters the recipient's name and the message, and a dispatch server intelligently routes the message to the recipient using an appropriate messaging engine.

5 Claims, 3 Drawing Sheets logic for an exemplary system selection method

U.S. PATENT DOCUMENTS

| | | | |
|---|---|---|---|
| 2004/0098484 A1 | 5/2004 | Wuebker | 709/227 |
| 2004/0098515 A1 | 5/2004 | Rezvani et al. | 709/400 |
| 2005/0009541 A1* | 1/2005 | Ye et al. | 455/466 |
| 2005/0114533 A1* | 5/2005 | Hullfish et al. | 709/230 |
| 2005/0198183 A1* | 9/2005 | Zilliacus et al. | 709/207 |

OTHER PUBLICATIONS

U.S. Appl. No. 10/872,993, filed Jun. 21, 2004, Weick et al.

* cited by examiner system overall logic logic for an exemplary system selection method optional additional logic

SYSTEM AND METHOD FOR INTEGRATING MULTIPLE MESSAGING SYSTEMS

RELATED APPLICATIONS

This application claims priority from U.S. provisional application Ser. No. 60/554,755, filed Mar. 18, 2004.

I. FIELD OF THE INVENTION

The present invention relates generally to computerized messaging services.

II. BACKGROUND

To send a message to a recipient, the message must be addressed to the recipient using the protocol of a particular communication or messaging system. For example, a user might have to decide whether to send a particular message over email, or by instant messaging services over Internet-connected computers, or by text entry on a telephone using short message service (SMS), or by a similar telephone-enabled messaging service known as multimedia messaging service (MMS), or by other messaging systems. Each system, not surprisingly, has advantages and drawbacks, and not all intended recipients access every system that a sender might use.

Thus, when deciding how to get a message to a recipient, a sender must think about and balance a variety of considerations, including cost, recipient capabilities, recipient presence and preferences, and so on. Then, the sender must start up or invoke the selected messaging system and use it, a task made more difficult as technological messaging innovations and capabilities outpace ease-of-use innovations. Having made these critical observations, the invention described below is provided.

SUMMARY OF THE INVENTION

A communication system includes a sender computer and means at the sender computer for invoking a message input file. The message input file need not be associated with any particular messaging engine. A user of the sender computer can enter a recipient's identification and a message into the message input file. A dispatch server communicates with the sender computer and with a recipient computer associated with the recipient's identification, and the dispatch server executes logic which includes receiving the input file from the sender computer. The logic also includes determining which messaging engine to use from a plurality of messaging engines that are available to the dispatch server. The message is sent to the recipient computer using the messaging engine identified by the server.

The message input file may be presented to a user of the sender computer as a visible form for typed data entry, or it may be made accessible to a user of the sender computer for audible data entry. In any case, owing the off-loading of messaging engine technical details to the server, the sender computer can be a light client that has no messaging engines.

In non-limiting implementations the server can determine whether a messaging system has been specified in the message input file and if so, the server can invoke a messaging engine that is associated with the messaging system. Also, the determining act executed by the server may be based on recipient presence and/or preference information. A default messaging engine can be selected in the absence of other messaging engine designation information.

In another aspect, a method for enabling a sender computer to send a message to a recipient computer using a message file and one of at least two messaging systems includes receiving user-entered messaging information in the file. The method also includes sending the file to a server computer having access to plural messaging systems. At the server computer, it is determined which one of the messaging systems to use to deliver the message. The user-entered messaging information is sent to the recipient computer using the selected messaging system.

In still another aspect, a server computer is accessible to a sender computer and to a recipient computer over the Internet. The server computer includes means for selecting one of plural messaging engines for invocation, in response to receiving a message from a sender computer not designating an engine. The server also includes means for formatting the message from the sender computer as appropriate for use with the selected messaging engine, for transmission thereof to the recipient computer using the selected messaging engine.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
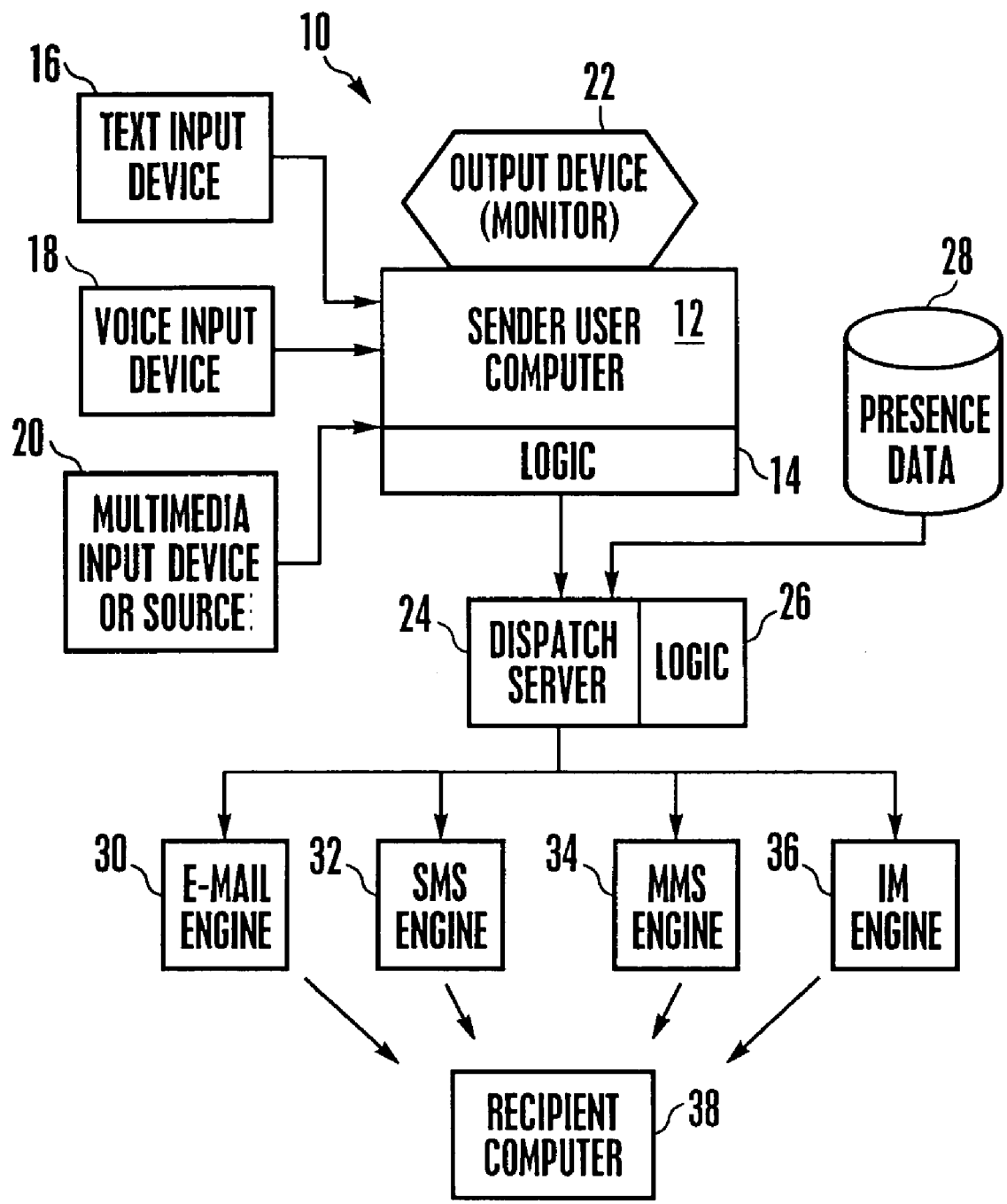
FIG. 1 is a block diagram of the present system.

Referring initially to FIG. 1, a system is shown, generally designated 10, which includes a sender user computer 12 that can execute logic in a module 14 in accordance with the present invention.

Thus, in the preferred non-limiting embodiment shown, the computers described herein may access one or more software or hardware elements to undertake the present logic. The flow charts herein illustrate the structure of the logic modules of the present invention as embodied in computer program software, in logic flow chart format, it being understood that the logic could also be represented using a state diagram or other convention. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer or microprocessor) to perform a sequence of function steps corresponding to those shown. Internal logic could be as simple as a state machine.

In other words, the present logic may be established as a computer program that is executed by a processor within, e.g., the present computers/servers as a series of computer-executable instructions. In addition to residing on hard disk drives, these instructions may reside, for example, in RAM of the appropriate computer, or the instructions may be stored on magnetic tape, electronic read-only memory, or other appropriate data storage device.

A text input device 16 such as a keyboard or keypad can be manipulated by a user to type information into the sender computer 12. Also, if desired a voice input device such as but not limited a microphone associated with voice recognition software can be used to input information into the sender computer 12. Furthermore, multimedia data can be input into the sender computer 12 from a source or device 20 of multimedia. One or more output devices, such as a monitor 22 or audible speakers, can be used to display data, including the below-described message input form, to the user of the sender computer 12.

Owing to the below-described logic, the sender computer 12 may but need not have any commercial messaging engines, such as email programs, instant messaging programs, and the like. Instead, it need only communicate with a dispatch server 24 using a generic, common, single message file described further below, consequently permitting the use of a thin client computer as the sender computer 12. Or, the sender computer 12 need have only one commercial messaging application which can be invoked by the user without concern for the type of message or transport. Regardless of whether it is a commercial messaging engine or not, once the single-unified messaging user interface described below is invoked, the user may create a message without concern about how to send it, because the dispatch server 24 can check such things as the message content (send to address, text only, or include multi media data), receiver's presence, availability, and so on and then send the message using the "best" or most appropriate messaging engine.

The dispatch server 24 can be a Web server and the communication with the sender computer 12 can be over the Internet. The dispatch server 24 may access a logic module 26 for executing the logic below. Recipient presence information can be received from a presence database 28 over the Internet if desired. The presence database 28 may be the one set forth in co-pending U.S. patent application Ser. No. 10/892,993, incorporated herein by reference. Among other things the presence data can include contact data such as what messaging systems the system recipients possess, which ones happen to be active, which systems a recipient might prefer to receive messages on, and so on. Also, the dispatch server 24 can access a single profile associated with the user of the sender computer 12, to manage multiple messaging accounts associated with the respective messaging engines discussed below.

As shown, the dispatch server 24 can access plural messaging engines, including an email engine 30, an SMS engine 32, an MMS engine 34, and an IM engine 36. Other engines can be included. Using a server-determined one of the messaging engines 30-36, messages from the sender computer 12 are transmitted to one or more recipient computers 38.

It is to be understood that when a messaging engine is selected by the server 24, the server 24 causes the engine to construct a message in the particular format of the messaging service represented by the engine. Thus, the server 24 can also send to the selected engine authentication information pertaining to the user of the sender computer 12, public passwords of the user of the sender computer 12, digital signatures of the user of the sender computer 12, and so on as might be required for desired features, e.g., encryption and the like, using the particular messaging service selected.

Figures 2, 3:
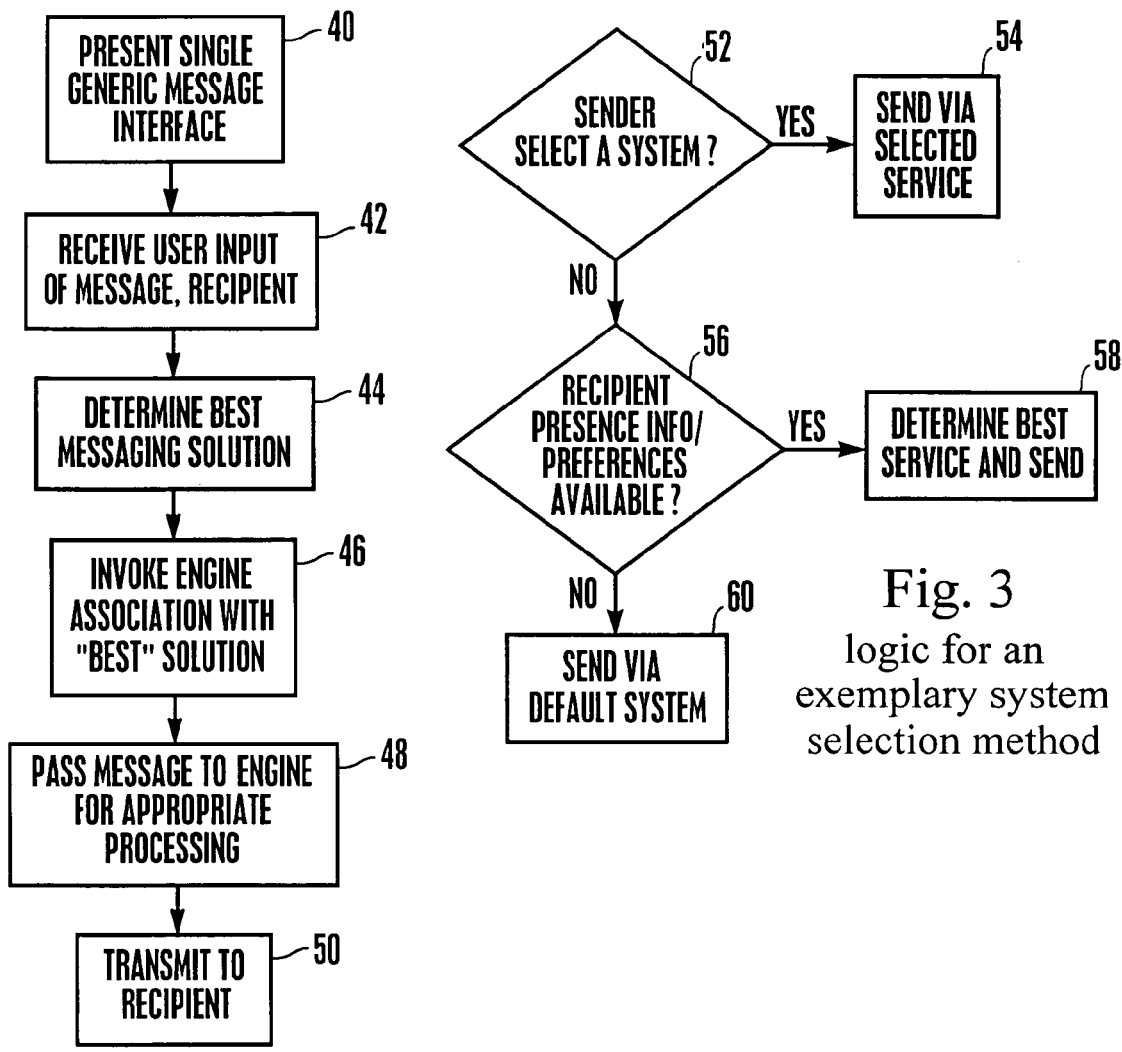
FIG. 2 is a flow chart of the overall logic.
FIG. 3 is a flow chart of an exemplary non-limiting logic for selecting a messaging system.

Now referring to FIG. 2, details of the present invention can be seen. Commencing at block 40, a single message interface is presented that is generic in that it can be used by a user to input at least a message and a recipient's identification, such as a name or user name, and optionally a preferred messaging service for delivery, to one of plural messaging engines as discussed further below. The interface can include a message input file that is made available to the user and that can be presented as, e.g., a simple two-field (recipient ID and message body) form on the screen of the monitor 20 or that can be presented aurally using audible prompts as set forth in the priority document.

At block 42, the user inputs at least a message and an intended recipient into the message input file made available at block 40. The file is sent to the dispatch server 24 at block 44, and at block 46, the dispatch server 24 determines which one of the plural messaging engines 30-36 shown in FIG. 1 is to be used. The message in the input file is reformatted or otherwise reconfigured at block 48 as appropriate for the particular messaging engine selected at block 46, and then transmitted, using the selected messaging engine, to the recipient computer 38 at block 50.

FIG. 3 shows one non-limiting method the dispatch server 24 can use to execute the selection at block 46 in FIG. 2. Commencing at decision diamond 52, the server 24 may determine whether the user of the sender computer 12 has selected a particular messaging system, and if so, the logic can flow to block 54 to use the system selected by the user. If no system has been selected, the logic can flow to decision diamond 56, wherein the dispatch server accesses the user presence database shown in FIG. 1 to identify the messaging services the recipient computer currently has active, and/or to determine which messaging service might be indicated by the recipient computer as being preferred. If a service has been designated as being preferred or is the only one available, that service is selected at block 58.

Moreover, the recipient user might indicate a profile that could be sent to the presence database shown in FIG. 1 and to which heuristic rules could be applied to find the "best" service. By way of non-limiting example, if the recipient user indicates he is in a meeting, a first messaging service, e.g., email, might be used, whereas if the recipient user indicates he is actively at work, a second service such as IM may be selected. And, a service can be selected based on the type or content of the message. For example, if the message includes multimedia, the MMS engine 34 can be selected. In the absence of any information such as that discussed above, a default service, e.g., email, may be invoked at block 60.

It may now be appreciated that the system of the present invention improves a user's messaging experience by removing an otherwise complicated messaging technology wall, making possible the use of lightweight client sender computers that are easily portable to many different operating systems. More specifically, the present invention transfers, from the sender computer 12 to the dispatch server 24, authentication, roster, presence, agents, transports, gateway, and trans-coding burdens, thus removing requirements for large amounts of processor capability and data storage in the sender computer 12. If switching is required between disparate networks that might be associated with respective messaging services, the switching is done by the server 24, transparently to the user of the sender computer 12. For example, from one message to the next from the sender computer 12, the server 24 can seamlessly switch between a Wireless Fidelity (802.11b) (Wi-Fi) network that might be used for one type of messaging service and a General Packet Radio Service (GPRS) network that might be used for another type of service. Moreover, well accepted applications such as Microsoft Outlook® email can be integrated into the system 10. Multiple user identities, each associated with a particular messaging service, can be managed by the server 24 through use of a single profile (mobile phone, office phone, fax, SMS, e-Mail addresses, IM, pager, device addresses, etc.), and this profile can be shared, if desired by the user, with other users in the system 10.

Figure 4:
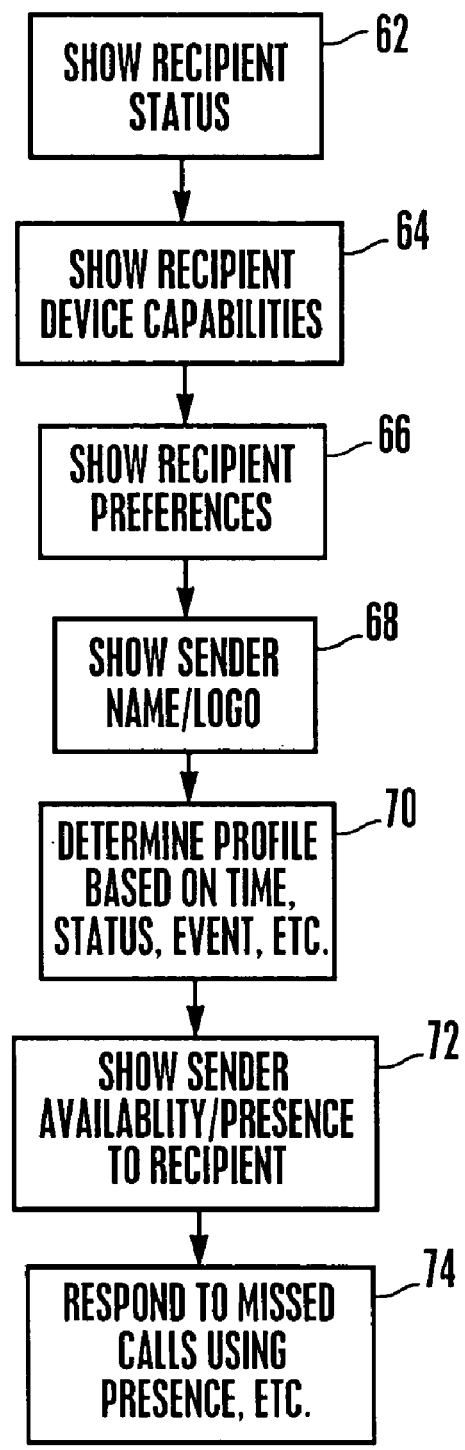
FIG. 4 is a flow chart showing optional logic for displaying various information.

FIG. 4 shows options that can be included in the system 10. At block 62, the server 24 may access the presence database 28 shown in FIG. 1 to send data to the sender computer 12 pertaining to the presence and/or profile and/or availability status of the recipient computer or computers 38, for display thereof on the monitor 22 of the sender computer 12. Also, at block 64 the messaging capabilities of the recipient computer 38 may be displayed on the monitor 22. The displayed capabilities can include indications of whether the recipient computer 38 is turned on, whether it is currently accepting phone calls, etc. The displayed capabilities can include indications of whether the recipient computer 38 can support various messaging services. Also, if desired at block 66 the messaging preferences of the user of the recipient computer 38, if available in the presence database or otherwise available to the server 24, can be sent to the sender computer 12 for display.

Still further, at block 68 custom logos of the user of the sender computer 12 may be made available to the server 24 for sending the logos for display to the recipient computer 38. Also, as another option, at block 70 the server 24 might determine the profile status of the user of the recipient computer 38, both for selecting a messaging engine as discussed above and for display of the status on the monitor of the sender computer 12. This can be based on, e.g., time of day, whether the user is in a meeting as indicated by a message the user might send to the dispatch server 24, whether the recipient computer 38 is energized, whether the user is in the user's office (and, hence, is expected to be available by phone), and so on. Likewise, if permitted by the user of the sender computer 12, similar information pertaining to the sending user can be sent to the server 24 for transmission of preselected information, if desired only to preselected recipient computers 38 at block 72. For example, the sender computer 12 can cause the server 24 to disclose an "in office" condition only to recipient computers 38 associated with co-workers and family members of the user of the sender computer 12. Likewise, whether the user of the sender computer 12 is at home might be disclosed only to recipient computers 38 associated with family members of the user of the sender computer 12, or the user of the sender computer can elect not to disclose any such information at all. The server 24 might also automatically respond to missed calls in either direction at block 74 based on the caller's presence/availability etc.

While the particular SYSTEM AND METHOD FOR INTEGRATING MULTIPLE MESSAGING SYSTEMS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

We claim:

1. A server computer accessible to at least one sender computer and at least one recipient computer over the Internet, comprising:

means for selecting one of plural messaging engines for invocation, in response to receiving a message from a sender computer not designating a message service, the means for selecting choosing, as the messaging engine:

if a recipient user indicates he is in a meeting, email:

if the recipient user indicates he is actively at work, instant messenger; and if the message includes multimedia, multimedia messaging service: and means for formatting the message from the sender computer as appropriate for use with the messaging engine selected by the means for selecting, for transmission thereof to the recipient computer using the messaging engine selected by the means for selecting.

2. The computer of claim 1, wherein the means for selecting includes means for determining whether a messaging system has been specified in the message and if so, invoking a messaging engine associated with the messaging system.

3. The computer of claim 1, wherein the means for specifying selects a messaging engine at least in part based on recipient presence information.

4. The computer of claim 1, wherein the means for specifying selects a messaging engine at least in part based on recipient preference information.

5. The computer of claim 1, wherein means for selecting selects a default messaging engine at least in the absence of other messaging engine designation information in the message from the sender computer.

* * * * *